May 30, 1967  A. W. MOSS  3,321,859
ELECTRICAL ILLUMINATION DEVICES
Filed Feb. 3, 1964  4 Sheets-Sheet 3
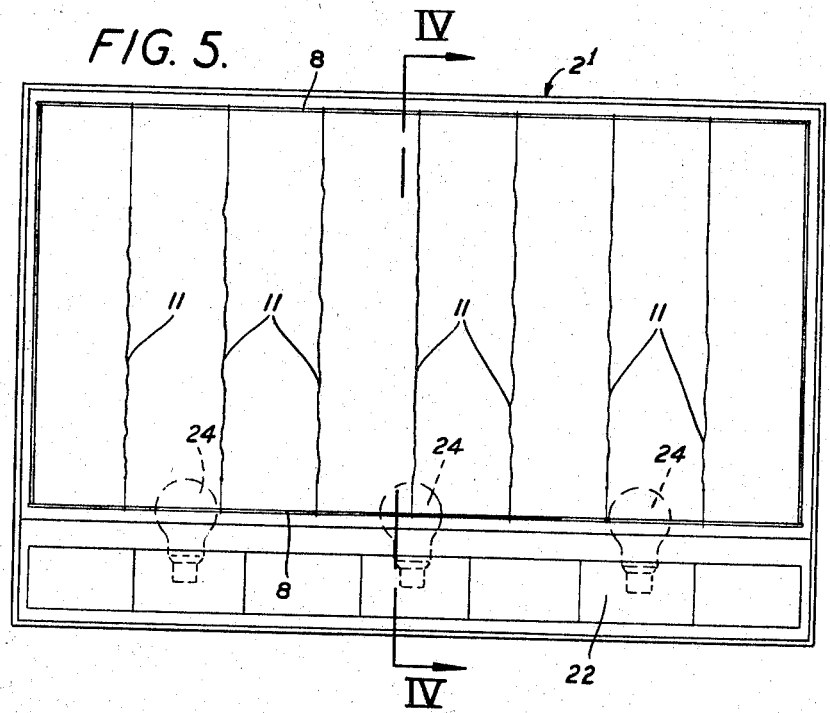
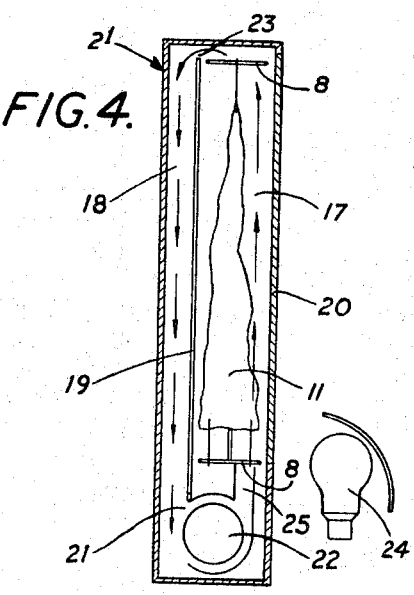
Inventor
Arthur William Moss
By May 30, 1967   A. W. MOSS   3,321,859
ELECTRICAL ILLUMINATION DEVICES
Filed Feb. 3, 1964   4 Sheets-Sheet 4

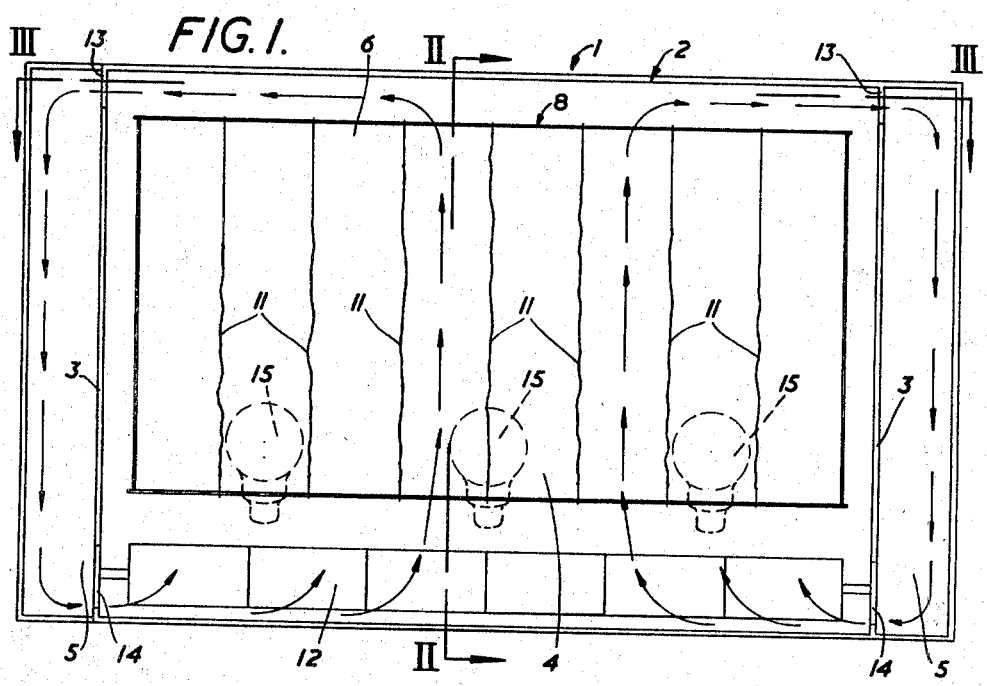

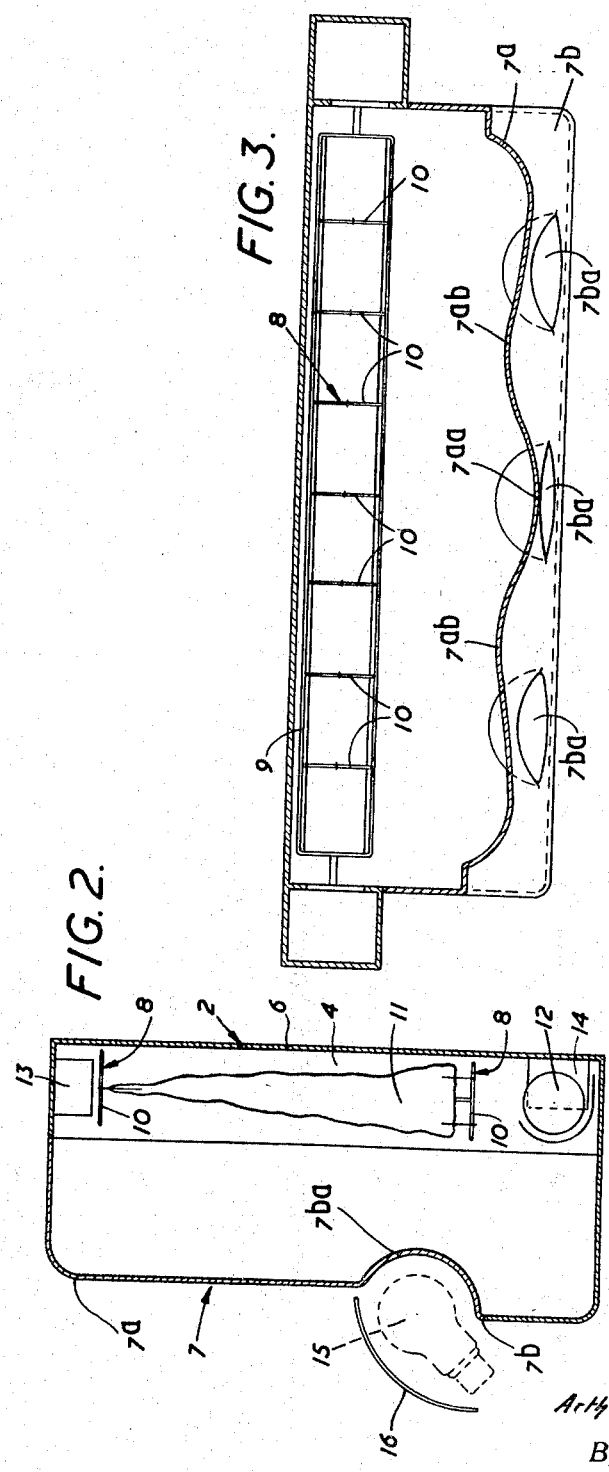

Inventor
Arthur William Moss

By
Walter Duley
Patent Agent.

United States Patent Office 3,321,859
Patented May 30, 1967

3,321,859
ELECTRICAL ILLUMINATION DEVICES
Arthur William Moss, Walsall, England, assignor to H. Frost & Company, Limited, Walsall, England, a British company
Filed Feb. 3, 1964, Ser. No. 341,896
Claims priority, application Great Britain, Mar. 16, 1963, 10,513/63
7 Claims. (Cl. 40—106.54)

This invention relates to electrical illumination devices. Devices in accordance with the present invention can be arranged to be embodied, for example, in heaters, such as in electric fires of the imitation solid-fuel type, or can be constructed to be used on their own as display appliances.

According to the invention, an electrical illumination device has movable material disposed in an air-tight, or substantially air-tight, box or casing having a viewing part in the form of a window or viewing screen, lamp means being provided for illuminating the movable material, and the device having means operable to cause the movable material to move so as to vary the lighting effect visible to a person viewing the material through the viewing part.

The movement of the movable material, when the device is in operation, may be caused by air currents or air eddys produced by operation of air-moving means driven by a motor.

Since, in arrangement in accordance with the invention, the box or casing is air-tight or substantially air-tight, soiling by atmospheric dust of the movable material inside the box or casing is minimised or prevented.

In one particular embodiment, the air-tight or substantially air-tight box or casing has a central compartment containing the movable material and the air-moving means and flanked by two upwardly extending side compartments or ducts each communicating at top and bottom with the central compartment, whereby operation of the air-moving means causes air to flow up, through the central compartment, past the movable material, and to return downwards to the air-moving means through the flanking side compartments or ducts. Or, in another particular embodiment, the air-tight or substantially air-tight box or casing has a front compartment containing the movable material, and a rear compartment communicating at top and bottom with the front compartment, the air moving means being disposed in a bottom portion of the box or casing whereby operation of said air moving means causes air to flow up, through the front compartment, past the movable material, and to return downwards to the air moving means through the rear compartment.

FIGURE 1 of the accompanying drawings shows by way of example, and in front elevation, an electric illumination device constructed in accordance with the present invention.

FIGURES 2 and 3 are sections on the lines II—II, FIGURE 1 and III—III, FIGURE 1, respectively.

FIGURES 4 and 5 show a modified construction in accordance with the invention, FIGURE 4 being a section on the line IV—IV, FIGURE 5.

Figure 6:
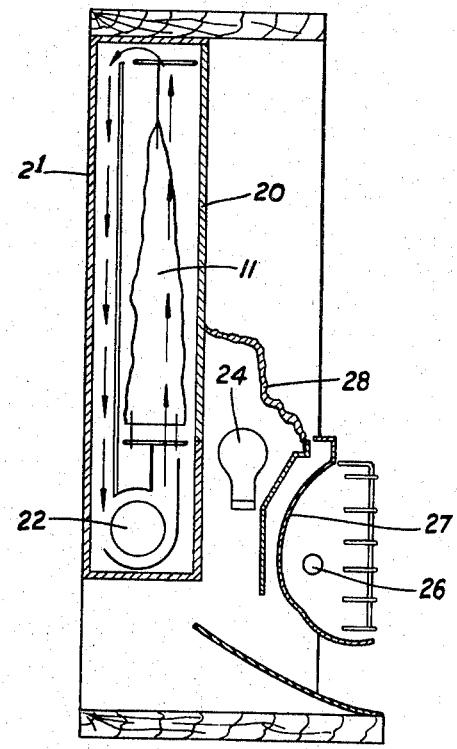
FIGURE 6 shows an electric fire embodying the device shown in FIGURES 4 and 5.

Referring to FIGURES 1 to 3 of the drawings, an electrical illumination device 1 comprises an air-tight metal casing 2 which is of oblong rectangular form in front view, and the interior of which is divided by vertical partitions 3 into a central main compartment 4 and two side compartments or ducts 5. The main compartment 4 has its back wall, shown at 6, blackened over the whole of its front face, and the front of said compartment 4 is closed by a translucent viewing screen 7, the main upper part 7a of which is of horizontally-curved undulating form, said screen upper part 7a having, viewed in horizontal cross-section a central forwardly-presented convex portion 7aa flanked at opposite sides by forwardly-presented concave portions 7ab. The said screen upper part 7a consists, in this particular embodiment, of a panel having thereon a light-diffusing surface formed by abrading on the panel, in a manner described in the specification of United States patent application Ser. No. 341,896, filed Feb. 3, 1964 by me jointly with Ernest Eugene Gardiner, a multiplicity of closely-adjacent thin horizontal or near horizontal broken or unbroken lines (not shown) extending from one side to the other of the panel.

Mounted in the central main compartment 4, and extending laterally of the viewing screen 7, is a pair of upper and lower wire frameworks 8 of a ladder formation in appearance, said frameworks each consisting of a rectangular outer frame 9 bridged intermediate its ends by cross-bars 10. Also housed in the central main compartment 4 is movable material in the form of a plurality of separate hanging flexible strips 11 of a flame-coloured material (for example satin nylon material) each strip 11 being anchored or tethered at top and bottom to respective cross-bars 10 of the frameworks 8 and each being of upwardly-tapering flame shape. Both side faces of each strip 11 constitute highly-reflective surfaces, and each strip 11 is mounted so that when stationary it is presented edgewise to the screen 7.

Disposed beneath the strips 11, and extending along the bottom of the main compartment 4, is a bladed rotary fan 12 driven by a suitable electric motor (not shown) the said fan being operable to produce an upwardly-ascending air flow past the flexible strips 11. The side compartments or ducts 5 each have upper and lower ports 13, 14 opening into the main compartment 4. The device 1 carries, outside the casing 2, electric lamps 15 for illuminating the strips 11 with red or orange light, said lamps being concealed from front view by a suitable shield such as 16 (FIGURE 2), and being arranged for illuminating the strips 11 through a lower portion 7b of the screen 7, said lower portion 7b having therein recesses 7ba accommodating portions of the lamps 15 as shown.

In order to operate the device 1, the lamps 15 and the fan motor are switched on, whereupon the fan 12 rotates and causes air to circulate in the air-tight casing 2 in the maner shown by the flow arrows in FIGURE 1, said air flowing up past the strips 11, and returning to the fan through the upper ports 13, compartments or ducts 5, and lower ports 14, some of the air pasing down through the one compartment or duct 5, and the remainder of the air passing down through the other compartment or duct 5. This air flow from the fan 12 causes the anchored or tethered flexible strips 11 illuminated by the lamps 15 to move with a fluttering motion, and the consequent variation in the lighting effect is such that, to a person viewing the illuminated strips 11 through the screen 7, the strips 11 simulate upwardly-shooting flames and a particular advantage of the construction described is that, since the casing 2 is air-tight, atmospheric dust cannot be drawn into said casing when the device is in operation, and soiling by airbourne dust of the strips 11 and of the inner surface of the viewing screen 7 (which soiling would reduce the lighting effect) is thereby minimised or prevented.

FIGURES 4 and 5 illustrate a modified arrangement for circulating the air for moving the flexible material. In the said FIGURES 4 and 5, the device has an air-tight metal casing 2¹ of oblong box form which, instead of being divided into central and side compartments, as in FIGURE 1, is divided into front and rear compartments, shown at 17, 18 respectively, by a vertical rectangular metal or plastic partition 19 extending for the entire length of the interior of the casing $2^1$. The casing is closed at the front by a translucent viewing screen 20; and extending along the bottom wall of the casing, in a space 21 below the partition 19, is a rotary fan 22 driven by a suitable motor (not shown). A space 23 is left between the top edge of the partition 19 and the top wall of the casing, the compartments 17, 18 thereby communicating with each other at the top through said space 23. The bottom space 21 communicates with the compartment 17 through a duct 25. Suspended flexible material, which in the particular construction shown are in the form of flame-shaped light-reflecting strips 11 tethered or anchored at top and bottom to framework 8, as in the case of the strips 11 shown in FIGURES 1 to 3, is disposed in the front compartment 17, behind the screen 20; and suitable lamp means 24 is provided, outside the casing, for the purpose of illuminating the strips 11 from the front. When the device is in operation, with the lamp means and fan switched on, air flows, from the fan 22, upwardly through the duct 25 to the front compartment 17 past the flexible strips 11 and, after entering the rear compartment 18 through the space 23, flows downwardly through the said rear compartment 18 and thence returns to the fan, the direction of flow being indicated by the flow arrows shown in FIGURE 4. The resultant movement of the strips 11, as viewed through the screen, causes the effect of upwardly-shooting flames to be imparted to the viewer. Since, as in the case of the casing 2 of the construction shown in FIGURES 1 and 3, the casing $2^1$ is air-tight, atmospheric dust cannot be drawn into said casing $2^1$ when the device is in operation, thereby minimising or preventing soiling of the strips 11 and the inner surface of the screen 20 by airborne dust.

In this embodiment each strip 11 is, in the manner indicated in FIGURE 4, mounted asymmetrically with respect to the duct 25, so that only part of each strip 11 is subject to the full force of the air flow.

If desired, instead of providing strips 11 constructed and arranged as shown, any other suitable construction and arrangement of movable material, movable by the air from the fan to vary the lighting effect visible through the screen, may be provided in the compartment 4 (FIGURE 1) or in the compartment 17 (FIGURE 4).

If desired, the arrangement shown in FIGURES 4 and 5 can be modified by providing, in place of the viewing screen 20 and lamp means 24, a viewing screen and lamp means constructed and arranged similarly to the screen 7 and lamps 15 shown in FIGURES 2 and 3, with portions of the lamps accommodated within recesses, similar to the recesses $7^{ba}$, in the lower portion of the viewing screen.

Whilst it is preferred that the front of the casing is closed by a translucent viewing screen, as in the arrangements shown, if desired the front of the casing may be closed by a transparent panel instead of a translucent screen.

It is not essential for the interior of the casing to be physically divided by vertical partitions and if desired sadi partitions can be omitted.

In a modification (not shown) of the arrangement shown in FIGURES 4 and 5, the strips 11 are placed in the rear portion of the casing $2^1$ and the partition 19 is omitted. In this modification the man is arranged so that when in operation it causes the air in the casing $2^1$ to flow upwardly in the rear portion of the said casing $2^1$ past the strips 11, and then to return downwardly through the front portion of the said interior of the casing $2^1$.

The illumination device can if desired be embodied in a heater, for example in an electric fire of the imitation solid fuel type. By way of example, FIGURE 6 illustrates an electric fire having embodied therein the device shown in FIGURES 4 and 5, the said fire being provided with a heating element 26, radiant-heat reflector 27, and imitation fuel 28. In this particular arrangement, the lamps 24 serve to illuminate the imitation fuel 28 as well as illuminating the strips 11, and the said imitation fuel 28 serves to conceal the lamps 24 from direct view.

I claim:
1. An electrical illumination device comprising: an airtight casing having a central compartment flanked by two upwardly-extending side compartments, said central compartment having a translucent viewing screen and said side compartments communicating at top and bottom with said central compartent, a plurality of elongated, anchored flexible strips disposed in said central compartment behind said translucent screen, said strips having light-reflecting surfaces, lamp means operable to illuminate said strips, whereby light from the lamp means is reflected by said reflecting surfaces onto said translucent screen, and motor-driven air-moving means disposed in said central compartment, said air-moving means being operable to cause air to flow up through the central compartment past the flexible strips, and to return downwards to the air-moving means through the side compartments, said air flow past the flexible strips causing the latter to move so as to vary the lighting effect visible to a person viewing the light-reflecting surfaces of the flexible strips through the viewing screen.

2. An electrical illumination device comprising: an airtight casing having a front compartment and a rear compartment, said rear compartment comunicating at top and bottom with said front compartment, and said front compartment having a front translucent viewing screen, elongated, anchored flexible strips disposed in said front compartment behind said translucent screen, said strips having light-reflecting surfaces; lamp means operable to illuminate said strips, whereby light from the lamp means is reflected by said reflecting surfaces onto said translucent screen, and motor-driven air-moving means disposed in a bottom portion of the casing, said air-moving means being operable to cause air to flow up through the front compartment past the flexible strips, and to return downwards to the air-moving means through the rear compartment, said air flow past the flexible strips causing the latter to move so as to vary the lighting effect visible to a person viewing the light-reflecting surfaces of the strips through the viewing screen.

3. An electrical illumination device, comprising: a casing having a translucent viewing screen, suspended flexible strips disposed in said casing behind said translucent screen at a plurality of locations from adjacent one side edge of said screen to adjacent the other side edge of the screen, said flexible strips having light reflecting surfaces, lamp means to illuminate said flexible strips so that light from the lamp means is reflected by said reflecting surfaces through said translucent screen, and air moving means to produce air currents past said flexible strips to cause the flexible strips to move so that, to a person viewing the flexible strips through the translucent screen, the reflections from the strips simulate flickering flames extending over a substantial area of the viewing screen.

4. An electrical illumination device as claimed in claim 3, in which said casing is provided with supporting means and in which said flexible strips have their top and bottom portions attached to said supporting means.

5. An electrical illumination device as claimed in claim 3, in which the translucent viewing screen is horizontally curved, so that said screen has, when viewed in horizontal cross section, a central forwardly extending convex portion.

6. An electrical illumination device comprising: a substantially air-tight casing having a translucent viewing screen, flexible strips suspended at the top in said casing behind said translucent screen, certain of said strips having light reflecting surface means, lamp means to illuminate said reflecting surface means so that the light is reflected by said reflecting surface means through said translucent screen, and air moving means to circulate air in said casing upwardly past said suspended strips, said casing being formed to circulate said moving air horizontally at the top of said casing and downwardly beyond said strips to return to said air moving means so that the upwardly moving air of said circulating air causes said flexible strips to move so as to vary the lighting effect visible to a person viewing the light reflecting surface means through said translucent screen.

7. An electrical illuminating device as claimed in claim 6, in which the lamp means to illuminate said reflecting surface means is located outside of said casing.

References Cited

UNITED STATES PATENTS

| | | | |
|---|---|---|---|
| 1,254,790 | 1/1918 | Fuller | 272—15 |
| 1,406,420 | 2/1922 | Schmidt | 272—15 X |
| 1,681,153 | 8/1928 | Johnston | 240—47 |
| 1,797,508 | 3/1931 | Lawrence | 40—37 |
| 2,285,535 | 6/1942 | Schlett | 240—10 X |
| 3,032,906 | 5/1962 | Stein | 40—138 |
| 3,180,043 | 4/1965 | Larson | 40—37 |

LAWRENCE CHARLES, *Primary Examiner.*

EUGENE R. CAPOZIO, JEROME SCHNALL, HERBERT F. ROSS, *Examiners.*